US006903677B2

(12) United States Patent
Takashima et al.

(10) Patent No.: US 6,903,677 B2
(45) Date of Patent: Jun. 7, 2005

(54) COLLISION PREDICTION DEVICE, METHOD OF PREDICTING COLLISION, AND COMPUTER PRODUCT

(75) Inventors: Tomonobu Takashima, Kawasaki (JP); Masatoshi Tohno, Kawasaki (JP); Tadao Omi, Kawasaki (JP); Taku Katagiri, Kawasaki (JP); Daisuke Ueno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/764,533

(22) Filed: Jan. 27, 2004

(65) Prior Publication Data

US 2004/0189512 A1 Sep. 30, 2004

(30) Foreign Application Priority Data

Mar. 28, 2003 (JP) ........................................ 2003-092570

(51) Int. Cl.⁷ .......................... G01S 13/93; G01S 13/86
(52) U.S. Cl. ............................. 342/70; 342/27; 342/52; 342/53; 342/54; 342/55; 342/175; 342/176; 342/179; 342/195; 180/167; 180/169; 701/300; 701/301
(58) Field of Search ................................ 701/300–301; 342/25 R–25 F, 27, 28, 52–56, 59, 70–72, 104–119, 125–147, 157, 158, 175, 176, 179, 189–197; 180/167–169; 340/436

(56) References Cited

U.S. PATENT DOCUMENTS 3,737,902 A * 6/1973 O'Hagan et al. ............ 342/107
3,992,709 A * 11/1976 Watanabe et al. ........... 342/109
4,008,473 A * 2/1977 Hinachi et al. ............. 342/109
4,257,703 A 3/1981 Goodrich
5,314,037 A * 5/1994 Shaw et al. ................. 180/169
5,471,214 A * 11/1995 Faibish et al. ............... 342/70
5,529,138 A * 6/1996 Shaw et al. ................. 180/169
6,025,796 A * 2/2000 Crosby, II .................... 342/70
6,061,015 A * 5/2000 Sugimoto .................... 342/71
6,087,928 A * 7/2000 Kleinberg et al. .......... 340/436
6,097,332 A * 8/2000 Crosby, II .................... 342/72
6,414,712 B1 7/2002 Wanielik et al.
6,420,996 B1 * 7/2002 Stopczynski et al. ......... 342/70
6,452,535 B1 * 9/2002 Rao et al. .................... 342/72
6,492,935 B1 * 12/2002 Higuchi ....................... 342/70
6,553,288 B2 4/2003 Taguchi et al.
6,590,521 B1 * 7/2003 Saka et al. ................... 342/70

FOREIGN PATENT DOCUMENTS

| JP | 10-047954 A | 2/1998 |
|---|---|---|
| JP | 2001-143199 A | 5/2001 |
| JP | 2002-257927 A | 9/2002 |
| WO | WO03/001472 A | 1/2003 |

\* cited by examiner

Primary Examiner—Bernarr E. Gregory
(74) Attorney, Agent, or Firm—Staas & Halsey LLP (57) ABSTRACT

An image sensor section and a millimeter-wave sensor section separately detect objects. A sensor matching section determines whether the objects detected by the image sensor section and the millimeter-wave sensor section are one and the same object. If the objects are one and the same object, the sensor matching section estimates a position of the obstacle after a certain period. A collision prediction section determined whether there is going to be a collision between the vehicle and the object 50 from the position estimated by the sensor matching section.

9 Claims, 7 Drawing Sheets

CALCULATION OF IMAGE SIZE

COLLISION PREDICTION DEVICE, METHOD OF PREDICTING COLLISION, AND COMPUTER PRODUCT

BACKGROUND OF THE INVENTION

1) Field of the Invention

The present invention relates to a technology for predicting collision of objects by using an image sensor and a millimeter-wave sensor.

2) Description of the Related Art

Vehicles are now an essential item in the human life. In the meantime, many lives and assets are lost due to traffic accidents. Therefore, a safety operation system is reviewed. Particularly, various kinds of techniques are proposed to support safe operation and to prevent traffic accidents in a vehicle warning device of the safety operation system.

For example, there is a method of measuring, with an ultrasonic sonar, a distance between a vehicle and obstacles around the vehicle at the time of parallel parking the vehicle. However, when a relative velocity between the obstacle and the vehicle is large, the distance measure with the ultrasonic sonar is not accurate. Therefore, this method is not suitable during a normal running of the vehicle. There is also another method of detecting, with a millimeter-wave sensor, an obstacle during normal running of the vehicle, and warning a driver about the obstacle. However, in this method, a distance between the vehicle on which the millimeter-wave sensor is mounted (hereinafter, "own vehicle") and the obstacle can be detected, but a possibility of a collision between the own vehicle and the obstacle cannot be detected.

In a signal processing method of a millimeter-wave sensor described in Japanese Patent Application Laid-open No. 2002-257927, a scanning is carried out using a beam of the millimeter-wave sensor in addition to detecting a distance between a physical object and a own vehicle. This makes it possible to detect a moving direction of the physical object, and one sensor can detect a distance to the physical object, a sped of the object, and a moving direction of the object.

A vehicle control device described in Japanese Patent Application Laid-open No. 2001-257927 makes a marker of a vehicle in the front flicker, and obtains information about the front vehicle from the marker, by using an image sensor that an own vehicle has. With this arrangement, a distance between the own vehicle and the vehicle in the front is calculated, and the run of the own vehicle is controlled.

However, according to the conventional technique disclosed in Japanese Patent Application Laid-open No. 2001-143199, the millimeter-wave sensor requires the function of scanning using the beam of the millimeter-wave sensor, resulting in high cost. Further, an erroneous recognition of an obstacle due to a reflection from a road surface or the like cannot be decreased sufficiently.

According to the conventional technique disclosed in Japanese Patent Application Laid-open No. 2002-257927, unless a predetermined marker is mounted beforehand on the vehicle running ahead of the own vehicle, distance between the two can not be detected.

SUMMARY OF THE INVENTION

It is an object of the present invention to solve at least the problems in the conventional technology.

A collision prediction device according to one aspect of the present invention is mounted on a own vehicle and includes an image sensor unit that extracts an object on an image and detects a size and a position of an object on the image; a millimeter-wave sensor unit that transmits a millimeter wave and detects a distance between the own vehicle and an object present in a sensing range; a sensor matching unit that determines that the object detected by the image sensor unit is the same as the object detected by the millimeter-wave sensor when a change rate of a size of the object detected by the image sensor unit on the image is in disagreement with a change rate of a distance from the own vehicle to the object detected by the millimeter-wave sensor, and when the objects are determined as identical, defines the object as a prospective collision obstacle, and calculates a relative position of the collision obstacle and the own vehicle after a predetermined time, based on the position of the obstacle on the image detected by the image sensor unit and the distance detected by the millimeter-wave sensor unit; and a collision prediction unit that predicts whether there is going to be a collision between the own vehicle and the collision obstacle from the position calculated by the sensor matching unit.

A method of predicting collision between a vehicle and an obstacle, according to another aspect of the present invention, includes detecting an object on an image and detecting a size and a position of an object on the image; detecting an object using a millimeter wave and detecting a distance between the vehicle and the object using the millimeter wave; deciding whether the object detected on the image and the object detected using the millimeter wave are one and the same object when a change rate of a size of the object detected by the image sensor unit on the image is in disagreement with a change rate of a distance from the own vehicle to the object detected by the millimeter-wave sensor; defining, when it is decided at the deciding that objects are one and the same object, the object as a prospective collision obstacle; calculating a relative position of the collision obstacle and the vehicle after a predetermined time, based on the position detected on the image and the distance detected using the millimeter wave; and predicting whether there is going to be a collision between the vehicle and the collision obstacle from the relative position calculated.

A computer program according to still another aspect of the present invention realizes the method according to the above aspect on a computer.

The other objects, features, and advantages of the present invention are specifically set forth in or will become apparent from the following detailed descriptions of the invention when read in conjunction with the accompanying drawings.

DETAILED DESCRIPTION

Exemplary embodiments of a collision prediction device, a method of predicting collision, and a computer program according to the present invention will be explained in detail below with reference to the accompanying drawings. This embodiment does not limit the present invention.

Figure 1:
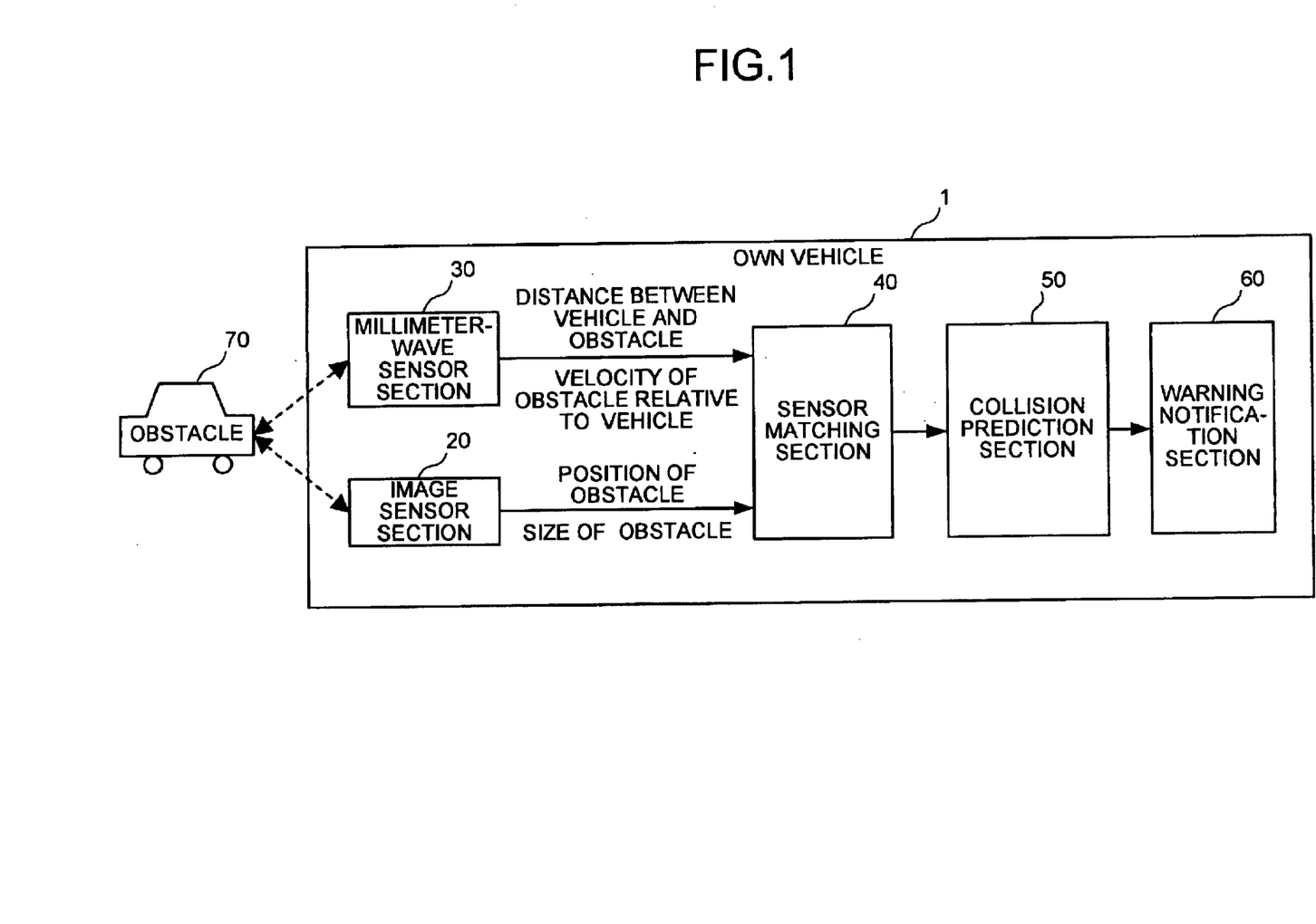
FIG. 1 is to explain the principle of a collision prediction according to the present invention.

First, a principle of collision prediction according to the present embodiment will be explained. FIG. 1 is to explain the principle of the collision prediction according to the present invention. An image sensor section 20, a millimeter-wave sensor section 30, a sensor matching section 40, a collision prediction section 50, and a warning notification section 60 are mounted on a vehicle (hereinafter, "own vehicle") 1. The millimeter-wave sensor section 30 calculates a distance from the own vehicle 1 to an obstacle 70 and also calculates a velocity of the obstacle 70 relative to the own vehicle 1. The image sensor section 20 calculates a position of the obstacle 70 on the image and a size of the obstacle on the image. The sensor matching section 40 matches the information obtained by the millimeter-wave sensor section 30 with the information obtained by the image sensor section 20, and estimates a position k(t) of the obstacle 70 after a predetermined time. The collision prediction section 50 predicts, based on the position k(t) estimated, whether there is going to be a collision between the own vehicle 1 and the obstacle 70. A warning notification section 60 outputs a warning, if the collision prediction section 50 predicts that there is going to be a collision, so that the driver of the own vehicle 1 comes to know that his vehicle is about to collide with the obstacle 70.

Figure 2:
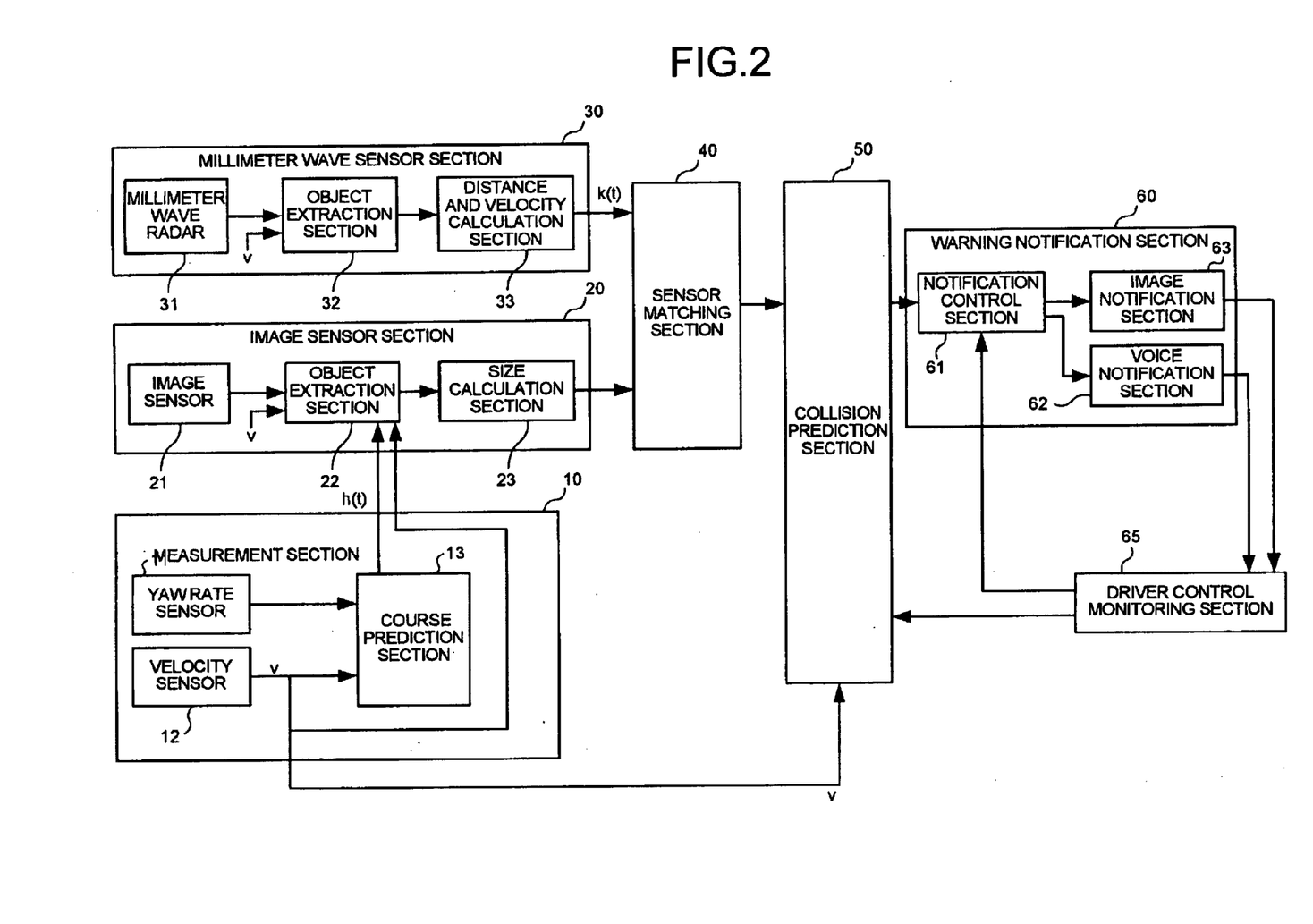
FIG. 2 is a block diagram of a collision prediction device according to an embodiment of the present invention.
Figure 3:
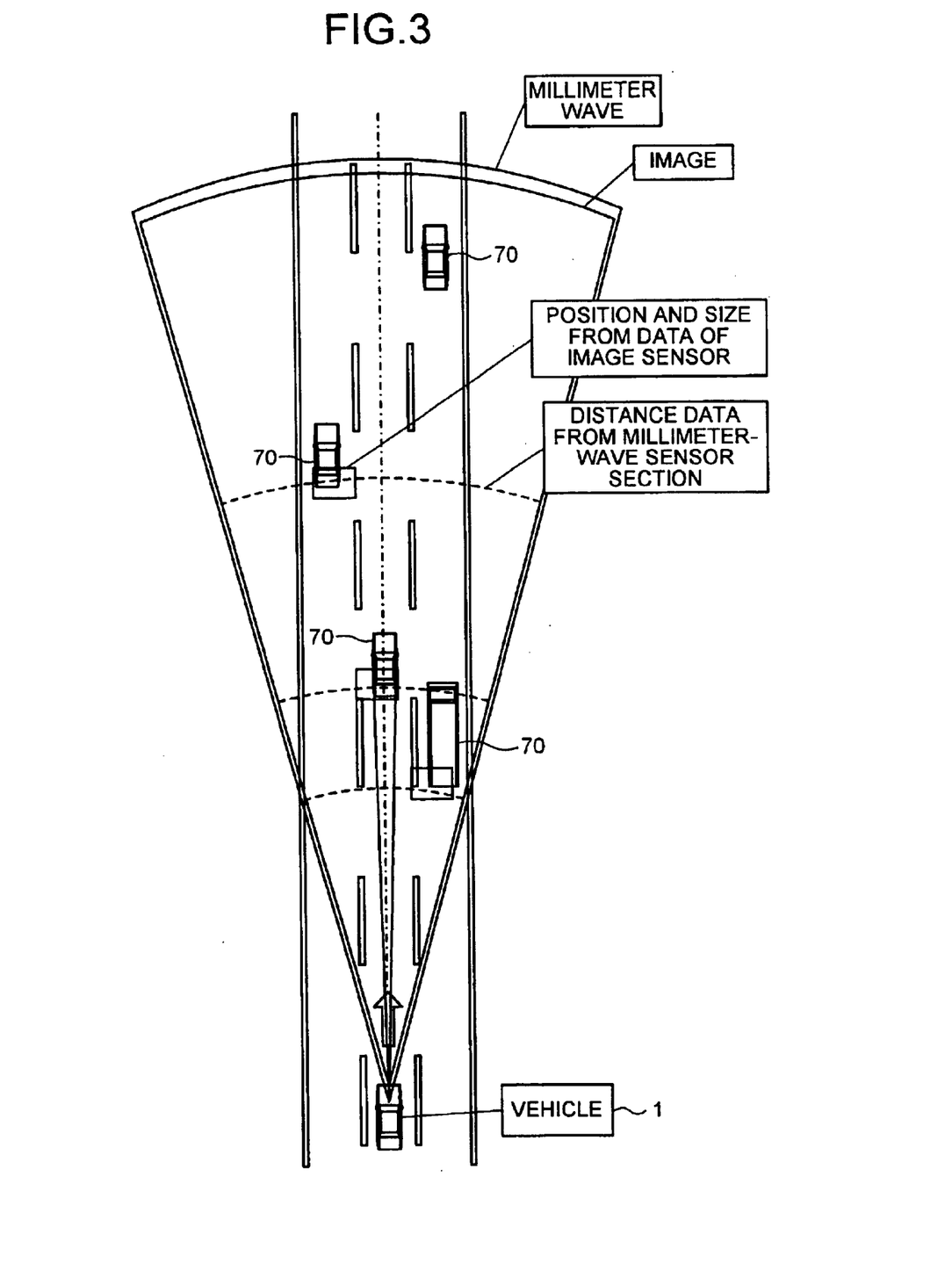
FIG. 3 is a schematic diagram of a sensing range.

FIG. 2 is a detailed block diagram of a collision prediction device according to an embodiment of the present invention. This collision prediction device includes a measurement section 10, the image sensor section 20, the millimeter-wave sensor section 30, the sensor matching section 40, the collision prediction section 50, a warning notification section 60, and a driver control monitoring section 65.

The measurement section 10 includes a yaw rate sensor 11, a velocity sensor 12, and a course prediction section 13. The yaw rate sensor 11 is, for example, a gyro sensor and is capable of measuring a yaw rate (i.e., an angular velocity) of the own vehicle 1. The velocity sensor 12 counts within a unit time a pulse that is issued according to a rotational angle of a shaft that rotates tires, and calculates a velocity v of the own vehicle 1. The course prediction section 13 estimates a position h(t) of the own vehicle 1 after a predetermined time t, based on the yaw rate of the own vehicle 1 obtained from the yaw rate sensor 11 and the velocity v of the own vehicle 1 obtained from the velocity sensor 12. An object extraction section 22 of the image sensor section 20 receives the velocity v calculated by the velocity sensor 12 and the position h(t) estimated by the course prediction section 13.

The image sensor section 20 includes an image sensor 21, the object extraction section 22, and a size calculation section 23. The image sensor 21 is, for example, a Charge Coupled Device (CCD) camera or a complementary metal oxide semiconductor (CMOS) camera, and photographs objects ahead of the own vehicle in the running direction. A desired angle of field of the image sensor 21 can be obtained by choosing a lens with an appropriate focal length. It is assumed here that the angle of field of the image sensor 21 is the same as that of a millimeter wave radar 31 described later. As an example, if the image sensor 21 is configured to capture 30 frames per second, it becomes possible to perform the collision prediction once per about 33 milliseconds.

Figure 4:
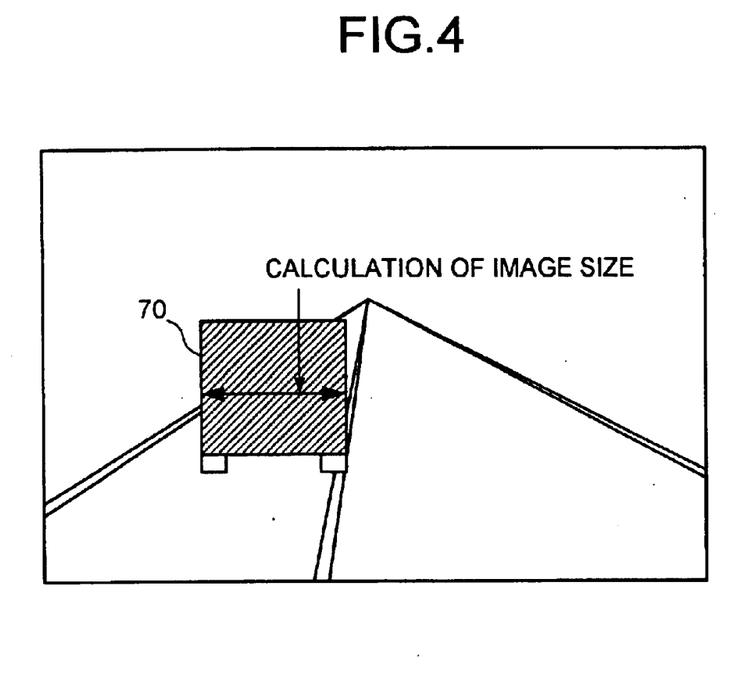
FIG. 4 is an image of an obstacle.

The object extraction section 22 limits, based on the velocity v and the position (t), a range for extracting an object from the image photographed by the image sensor 21. The object extraction section 22 identifies one object, from among the objects in the image, that has the highest possibility to collide with the own vehicle 1. If the image is something like the one shown in FIG. 4, the object extraction section 22 excludes the road, the divider, and the background etc. from the velocity v and the position h(t), and identifies an image of the obstacle 70. The size calculation section 23 calculates a width, as a number of pixels, in the lateral direction of the image of the obstacle 70. The size calculation section 23 also detects a position (i.e., two-dimensional coordinates) of the obstacle 70 on the image, and transmits this information to the sensor matching section 40.

The millimeter-wave sensor section 30 includes the millimeter wave radar 31, the object extraction section 32, and a distance and velocity calculation section 33. The millimeter-wave sensor section 30 obtains a distance between the own vehicle 1 and objects ahead of the own vehicle 1 and calculates a velocity of the objects relative to the own vehicle 1 from a Doppler shift of the radar using a frequency modulation continuous wave system (FMCW system), for example. The millimeter wave radar 31 generates a millimeter wave to a certain angle of field (i.e. the same angle of field as that of the image sensor 21), and detects a reflection wave from the obstacle 70. A beam width of a millimeter wave from the millimeter wave radar 31 is determined according to directional characteristics of an aerial. The beam width is set to a wide field of view on the general road, and is set to a narrow field of view on the automobile expressway, thereby improving a resolution.

The object extraction section 32 determines that, from among reflection waves detected by the millimeter wave radar 31, a reflection wave of a low detection level because of a long distance from the own vehicle 1 is from an object having a low possibility of a collision, and thus excludes the reflection wave. The object extraction section 32 determines that a reflection wave of a high detection level because of a short distance from the own vehicle is from an object having a high possibility of a collision, and thus extracts the reflection wave. The object extraction section 32 also extracts only the obstacle 70 having a possibility of a collision of an object against the own vehicle 1 from among the reflection waves detected by the millimeter wave radar 31 based on the velocity v of the own vehicle 1 obtained by the velocity sensor 12. When the millimeter-wave sensor section 30 can detect a moving direction of an object, the obstacle 70 having a possibility of a collision can be extracted using the position h(t) of the own vehicle 1 calculated by the course prediction section 13 and the velocity v of the own vehicle 1. The distance and velocity calculation section 33 calculates a distance between the own vehicle 1 and the obstacle 70 and a velocity of the obstacle 70 relative to the own vehicle 1, based on a time difference between an output emission wave and a detected reflection wave, and transmits the calculated information to the sensor matching section 40.

The sensor matching section 40 matches the distance from the own vehicle 1 to the obstacle 70 transmitted from the distance and velocity calculation section 33 of the millimeter-wave sensor section 30 with the size (i.e., number pixels) of the obstacle 70 on the image transmitted from the size calculation section 23 of the image sensor section 20.

The matching is carried out this time to confirm that the image sensor section 20 and the millimeter-wave sensor section 30 extract data of the same obstacle 70. When the obstacles are confirmed as identical, the position k(t) of the identified obstacle 70 after a predetermined time is calculated, and a result is transmitted to the collision prediction section 50. On the other hand, when the obstacles are confirmed as not identical, a decision is made that the image sensor section 20 or the millimeter-wave sensor section 30 made an erroneous recognition, and these obstacles 70 are excluded from obstacles having a possibility of a collision.

The collision prediction section 50 predicts a collision between the own vehicle 1 and the obstacle 70 using the velocity v of the own vehicle 1 and the position k(t) of the obstacle 70 matched by the sensor matching section 40. When the collision prediction section 50 determines that the own vehicle 1 and the obstacle 70 collide against with each other within a predetermined time (for example, 3 seconds), the collision prediction section transmits a collision prediction signal to set a warning on to the warning notification section 60. When the driver control monitoring section 65 described later inputs an instruction to the collision prediction section 50 to reset the collision prediction signal, the collision prediction signal is reset.

The warning notification section 60 includes a notification control section 61, a voice notification section 62, and an image notification section 63. The notification control section 61 instructs the voice notification section 62 and the image notification section 63 to give a warning, based on the prediction of a collision between the own vehicle 1 and the obstacle 70 transmitted from the collision prediction section 50. The voice notification section 62 gives a warning sound, or issues a warning message to the driver of the own vehicle 1 to take an action to avoid a collision. The image notification section 63 displays a warning message on a monitoring screen for the driver of the own vehicle 1 to urge the driver to take an action to avoid a collision. When the notification control section 61 receives a signal from the driver control monitoring section 65 that indicates that the driver has taken a collision avoidance control, the notification control section 61 instructs the image notification section 63 and the voice notification section 62 to stop warning. The driver control monitoring section 65 may directly transmit the instruction to the voice notification section 62 and the image notification section 63 to stop warning.

When the driver carries out the collision avoidance control to put on the brake after the image notification section 63 and the voice notification section 62 warn the driver, the driver control monitoring section 65 detects the control, and transmits a detection signal to the collision prediction section 50 and the warning notification section 60. When the detection signal is input to the collision prediction section 50, the collision prediction signal is reset as described above.

Figure 5:
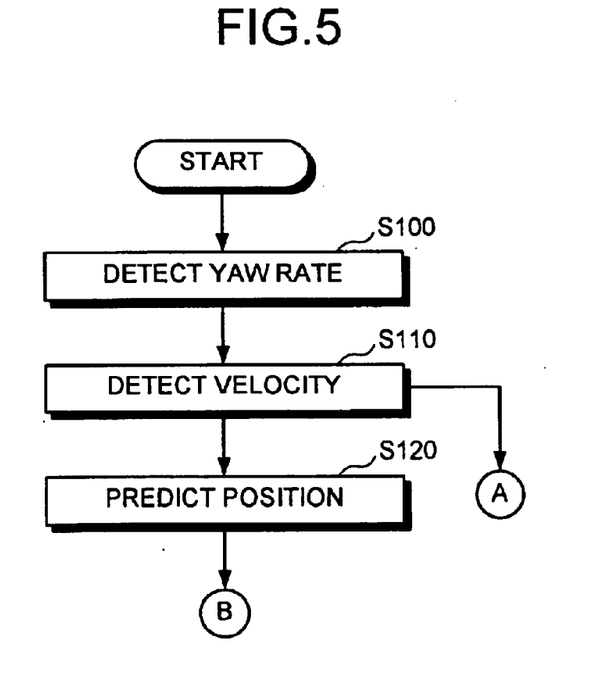
FIG. 5 is a flowchart of a process for estimating a position of a own vehicle.

A process of extracting the obstacle 70 will be explained next. FIG. 5 is a flowchart that illustrates a process of calculating the estimate position of the own vehicle according to the present embodiment.

The yaw rate sensor 11 of the measurement section 10 measures a yaw rate of the own vehicle 1 (step S100), and transmits the yaw rate to the course prediction section 13. At the same time, the velocity sensor 12 of the measurement section 10 measures the velocity v of the own vehicle 1 (step S10), and transmits the velocity v to the course prediction section 13. Further, the measured velocity v of the own vehicle is transmitted to the object extraction section 22 of the image sensor section 20 and the object extraction section 32 of the millimeter-wave sensor section 30. The course prediction section 13 calculates the position h(t) of the own vehicle 1 after a predetermined time, based on the yaw rate measured by the yaw rate sensor 11 and the velocity v of the own vehicle 1 measured by the velocity sensor 12 (step S130). Further, the position h(t) of the own vehicle 1 is transmitted to the object extraction section 22 of the image sensor section 20.

Figure 6:
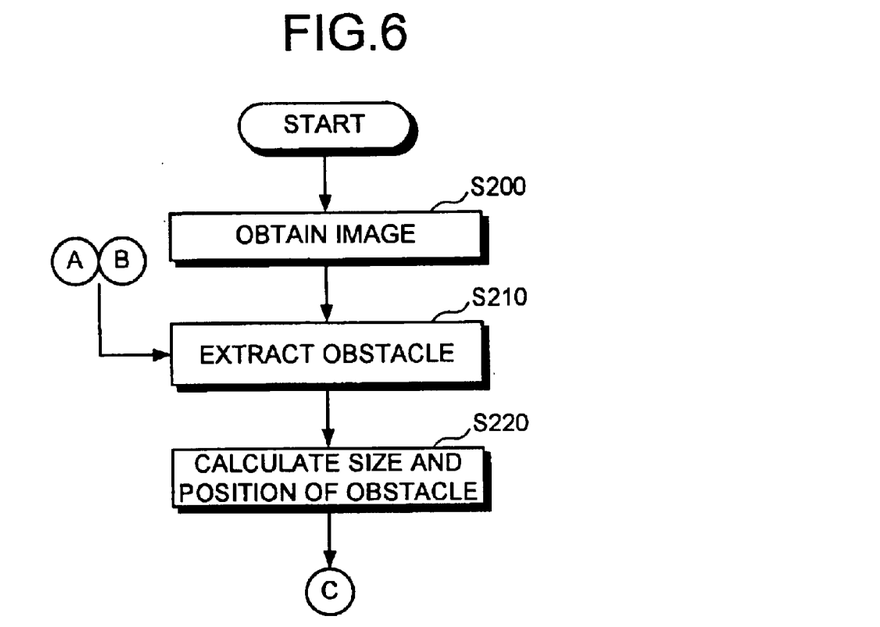
FIG. 6 is a flowchart of a process for calculating size and position of the obstacle on the image.

A process in which the image sensor section 20 shown in FIG. 20 calculates the size of the obstacle 70 on the image and the position of the obstacle 70 on the image will be explained next. FIG. 6 is a flowchart that illustrates a process of calculating the size of the obstacle on the image and the position of the obstacle on the image.

First, the image of an object ahead of the own vehicle 1 photographed by the image sensor 21 of the image sensor section 20 is obtained at every 33 milliseconds, for example (step S200), and the image is transmitted to the object extraction section 22. Only the obstacle 70 that has a possibility of a collision is extracted based on the image transmitted to the object extraction section 22, the own vehicle velocity v measured by the velocity sensor 12, and the position h(t) of the own vehicle 1 calculated by the course prediction section 13 (step S210). Only the object on the road is extracted as the obstacle 70, based on the position h(t) of the own vehicle 1, for example. Further, a stationary object is excluded from a range of the obstacle 70 based on the own vehicle velocity v. Further, an image of a manhole having a round shape is excluded from the objects in the image, thereby to squeeze the obstacle 70.

The size calculation section 23 calculates the size of the obstacle 70 on the image (i.e., number of pixels in the lateral direction) and the position (i.e., two-dimensional coordinates) of the obstacle 70 on the image, based on the image of the extracted obstacle 70 (step S330). When the size of an object n on the image at time t is expressed as Wn(t), a value C1 that satisfies an equation (1) is present.

$$((Wn(t)-Wn(t-1))/(Wn(t-1)-Wn(t-2))=C1 \tag{1}$$

Only an object of which C1 is within a certain range is extracted as the obstacle 70. On the left side of the equation (1), a denominator expresses a change in the size of the object n on the image from time (t−2) to time (t−1), and a numerator expresses a change in the size of the object n on the image from time (t−1) to time t. Therefore, C1 expresses a change rate of the size of the object n on the image within a constant time. When this change rate is within a predetermined range, these objects are determined as identical.

A calculation of the size of the obstacle 70 on the image once per every 33 milliseconds will be considered as an example. Assume that Wn(t) is 100 pixels, that Wn(t−1) is 99 pixels, and that Wn(t−2) is 98 pixels. Then, C1 becomes 1.0 from the equation (1). When C1 is set to 0.9 to 1.1 taking a measurement error into account, 1.0 is within the range, and is extracted as the obstacle 70. On the other hand, assume that Wn(t) is 200 pixels, that Wn(t−1) is 100 pixels, and that Wn(t−2) is 99 pixels. Then, C1 becomes 100 from the equation (1). In this case, while the size of the object on the image changes by only one pixel during the first 33 milliseconds, the image size changes by as many as 200 pixels during the next 33 milliseconds. This change cannot occur during the norm driving. Therefore, it is determined that the object is erroneously recognized due to noise or the like, and the object is excluded from a range of the obstacle 70.

When the size of an object n on the image at time t is expressed as Wn(t), a value C2 that satisfies an equation (2) is present.

$$Wn(t)-Wn(t-1)=(Wn(t-1)-Wn(t-2))+C2 \quad (2)$$

Only an object of which C2 is within a certain range may be extracted as the obstacle 70. The ranges of values of C1 and C2 are registered in advance in the size calculation section 23 based on the performance of the image sensor section 20 and experiment values. The size of the obstacle 70 on the image calculated by the size calculation section 23 and the position of the obstacle 70 on the image are transmitted to the sensor matching section 40.

Figure 7:
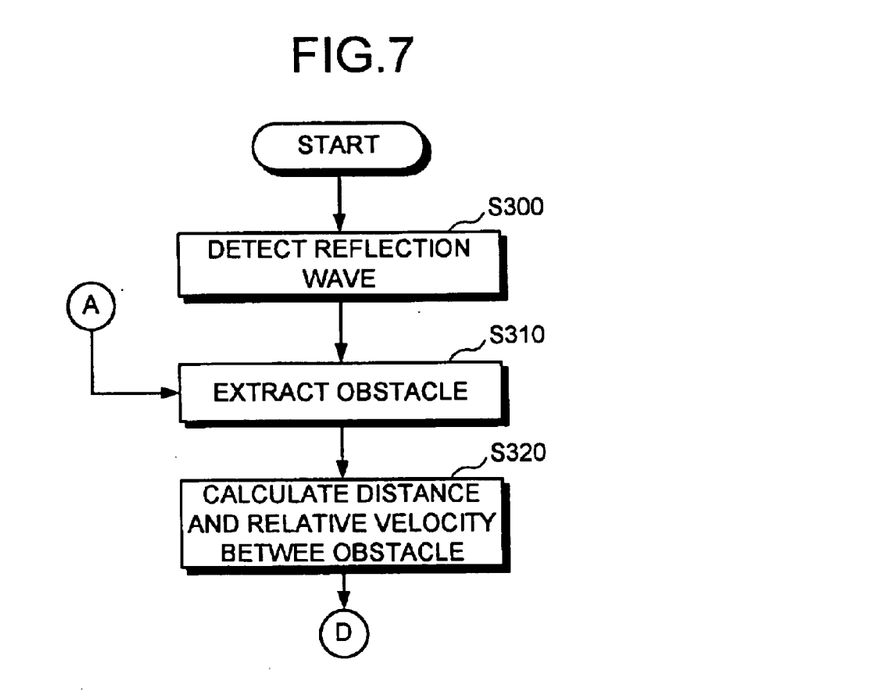
FIG. 7 is a flowchart of a process for calculating the distance from the own vehicle to the obstacle and the velocity of the obstacle relative to the own vehicle.

A process in which the millimeter-wave sensor section 30 shown in FIG. 2 calculates the distance from the own vehicle 1 to the obstacle 70 and the velocity of the obstacle 70 relative to the own vehicle 1 will be explained next. FIG. 7 is a flowchart that illustrates a process of calculating the distance from the own vehicle to the obstacle and the velocity of the obstacle relative to the own vehicle according to the present embodiment.

The millimeter wave radar 31 of the millimeter-wave sensor section 30 detects a reflection wave from the object (step S300), and outputs the detection wave to the object extraction section 32 together with the emission wave. The object extraction section 32 extracts only the obstacle 70 that has a possibility of a collision, based on the reflection wave and the emission wave. For example, the object extraction section 32 excludes a reflection wave of a small detection level as the reflection wave from an object having a low possibility of a collision that is far from the own vehicle 1, from among the obtained reflection wave. The object extraction section 32 extracts a reflection wave having a large detection level as the reflection wave from an object having a high possibility of a collision that is near the own vehicle 1 (step S320). The velocity v of the own vehicle 1 obtained by the velocity sensor 12 is input to the object extraction section 32. The velocity v is compared with the distance between the own vehicle 1 and the object obtained by the millimeter wave radar 31, and the relative velocity. A stationary object such as a wall is excluded from the obstacle 70. Further, based on the distance between the own vehicle 1 and the object obtained by the millimeter wave radar 31 and the velocity of the object relative to the own vehicle 1, an object having an extremely low possibility of a collision is excluded from the obstacle 70. For example, when a distance between the own vehicle 1 and the obstacle 70 is long (e.g., 100 meters) when the velocity of the own vehicle is slow (e.g., 30 km/h), the object has an extremely low possibility of a collision. Therefore, the object is excluded from the obstacle 70.

The distance and velocity calculation section 33 calculates a distance between the own vehicle 1 and the extracted obstacle 70 and a velocity of the obstacle 70 relative to the own vehicle 1 (step S330). Assume that a distance between an object m and the own vehicle 1 at time t is expressed as Dm(t), and that a velocity of the object m relative to the own vehicle 1 at time t is expressed as Vm(t). When a time change from time (t−1) to time t is expressed as Δt, a value C3 that satisfies an equation (3) is present. Only an object of which C3 is within a certain range is extracted as the obstacle 70.

$$Vm(t-1)\cdot \Delta t = C3 \cdot Dm(t)-Dm(t-1) \quad (3)$$

In the equation (3), the left side expresses a change in the distance from the own vehicle 1 to the object m during a period from time (t−1) to time t when the own vehicle 1 and the object m run at the relative velocity of time (t−1). The right side expresses a change in the distance between the own vehicle 1 and the object m. Ideally, C3 is 1, however, when C3 is within a certain range or below, the objects are determined as identical, taking a measurement error into account.

When a distance between the object m and the own vehicle 1 at time t is expressed as Dm(t), a value C4 that satisfies an equation (4) is present.

$$((Dm(t)-Dm(t-1))/Dm(t-1)-Dm(t-2)=C4 \quad (4)$$

Only the object m of which C4 is within a certain range is extracted as the obstacle 70. In the equation (4), the denominator expresses a change in the distance from the own vehicle 1 to the object m during a period from time (t−2) to time (t−1), and the numerator expresses a change in the distance from the own vehicle 1 to the object m during a period from time (t−1) to time t. C3 expresses a change rate of a distance from the own vehicle 1 to the object m during a constant time. When this change rate is within a certain range, the objects are determined as identical.

For example, a distance from the own vehicle 1 to the object m is measured at every 33 milliseconds. In this case, when the distance from the own vehicle 1 to the object m changes from 20 meters to 10 meters during 33 milliseconds, this means that the distance from the own vehicle 1 to the object m changes by about 300 meters per one minute. This cannot occur based on common sense. When this change is expressed, a decision is made that the information is based on an erroneous recognition, and the object m is excluded from the range of the obstacle 70.

When the size of the object m on the image at time t is expressed as Wm(t), a value C5 that satisfies an equation (5) is present.

$$Dm(t)-Dm(t-1)=Dm(t-1)-Dm(t-2)+C5 \quad (5)$$

Only an object of which C5 is within a certain range may be extracted as the obstacle 70. The ranges of values of C3, C4, and C5 are registered in advance in the size calculation section 23 based on the performance of the image sensor section 20 and experiment values.

The distance and velocity calculation section 33 transmits the distance from the own vehicle 1 to the obstacle 70 and the velocity of the obstacle 70 relative to the own vehicle 1, to the sensor matching section 40.

Figure 8:
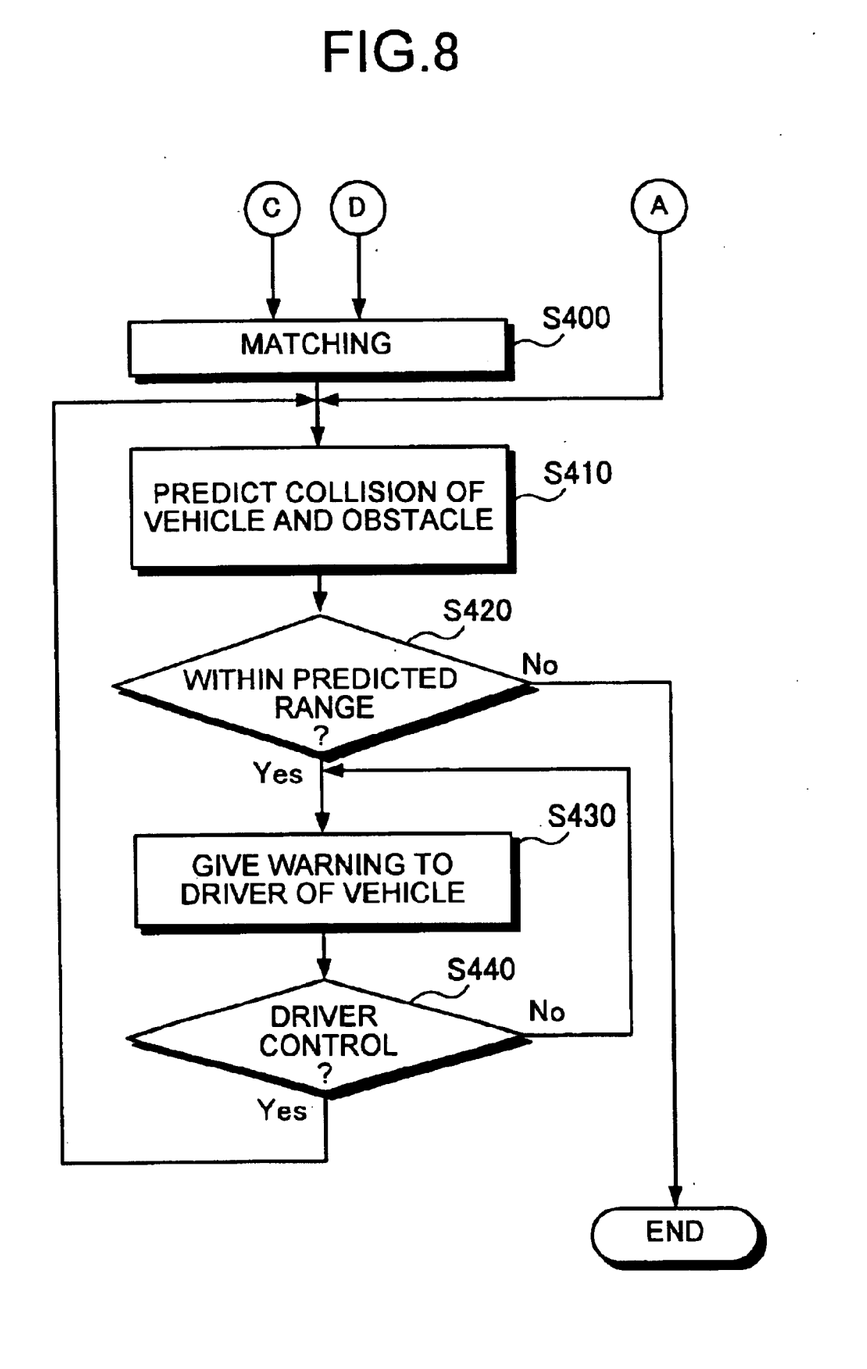
FIG. 8 is a flowchart of a process of generating a warning.

A flow of a generation of a warning by the collision prediction section shown in FIG. 2 will be explained next. FIG. 8 is a flowchart of a process in which the collision prediction section shown in FIG. 2 generates a warning.

The size of the obstacle 70 on the image and the position of the obstacle 70 on the image obtained by the image sensor section 20 are transmitted to the sensor matching section 40. At the same time, the distance from the own vehicle 1 to the obstacle 70 and the velocity of the obstacle 70 relative to the own vehicle 1 obtained by the millimeter-wave sensor section 30 are transmitted to the sensor matching section 40. The sensor matching section 40 matches the distance from the own vehicle 1 to the obstacle 70 obtained by the millimeter-wave sensor section 30 with the size of the obstacle 70 on the image obtained by the image sensor section 20 (step S400). For example, when the size of the object n (i.e., the obstacle 70) on the image at time t calculated by the image sensor section 20 is expressed as Wn(t), and also when the distance from the own vehicle 1 to the object m (i.e., the obstacle 70) calculated by the millimeter-wave sensor section 30 is expresses as Dm, a value C6 that satisfies an equation (6) is present.

$$Dm(t)/Dm(t-1)=C6 / (Wn(t)/Wn(t-1)) \quad (6)$$

The object m and the object n of which C6 are within a predetermined range are determined as identical. The left side of the equation (6) expresses a change rate of the distance from the own vehicle 1 to the obstacle 70 from time (t−1) to time t. The denominator on the right side expresses a change rate of the size of the obstacle 70 on the image from time (t−1) to time t. When the change rate of the distance and the change rate of the image size are in disagreement (for example, inversely proportional), and also when C6 changes within a predetermined range, the distance from the own vehicle 1 to the obstacle 70 and the size of the obstacle 70 on the image are matched. The range of the value of C6 is registered in advance in the sensor matching section 40 based on the performance of the image sensor section 20 and the millimeter wave radar section 30 and experiment values.

Assume that the distance from the own vehicle 1 to the obstacle 70 is 30 meters and the size of the obstacle 70 on the image is 27 pixels at time (t−2), that the distance from the own vehicle 1 to the obstacle 70 is 15 meters and the size of the obstacle 70 on the image is 54 pixels at time (t−1), and that the distance from the own vehicle 1 to the obstacle 70 is 10 meters and the size of the obstacle 70 on the image is 90 pixels at time t. C6 during the period from time (t−2) to time (t−1) is 1 from the equation (6). Similarly, C6 during the period from time (t−1) to time t is 0.9 from the equation 6. Ideally, C6 expresses a constant value. However, when C6 expresses a value within a certain range, the objects are determined as matched, and the object m and the object n are determined as identical, taking a measurement error into account. On the other hand, when the value of C6 does not show a constant value and when a fluctuation is large, it is determined that the object m and the object n are not identical. In this way, only the information about the object that matches any one object is used as the information about the obstacle 70, and the information is transmitted to the collision prediction section 50. On the other hand, the object that does not match any other object is determined as being detected based on an erroneous recognition, and the object is excluded from a range of the obstacle 70. The sensor matching section 40 obtains the position k(t) of the obstacle 70, based on the position of the obstacle 70 on the image (i.e., two-dimensional coordinates) according to the image sensor section 20 and the distance from the own vehicle 1 to the obstacle 70 according to the millimeter-wave sensor section 30. In other words, the information about the obstacle 70 in the left and right directions can be obtained from the position on the image, and the information about the depth direction can be obtained from the distance from the own vehicle 1 to the obstacle 70. Therefore, the position k(t) of the obstacle 70 is obtained from these pieces of information.

The collision prediction section 50 predicts a collision between the own vehicle 1 and the obstacle 70 (step S410). This collision prediction is carried out using the position k(t) of the obstacle 70 that is calculated by the sensor matching section 40. The distance from the own vehicle 1 to the obstacle 70 at time t can be calculated based on the position k(t) of the obstacle 70. A condition in which this distance comes closer than a predetermined range C7 is expressed by an equation (7).

$$|k(t)| \leq C7 \quad (7)$$

A condition in which the equation (7) is satisfied within a time C8 is expressed by an equation (8).

$$t \leq C8 \quad (8)$$

Figure 9:
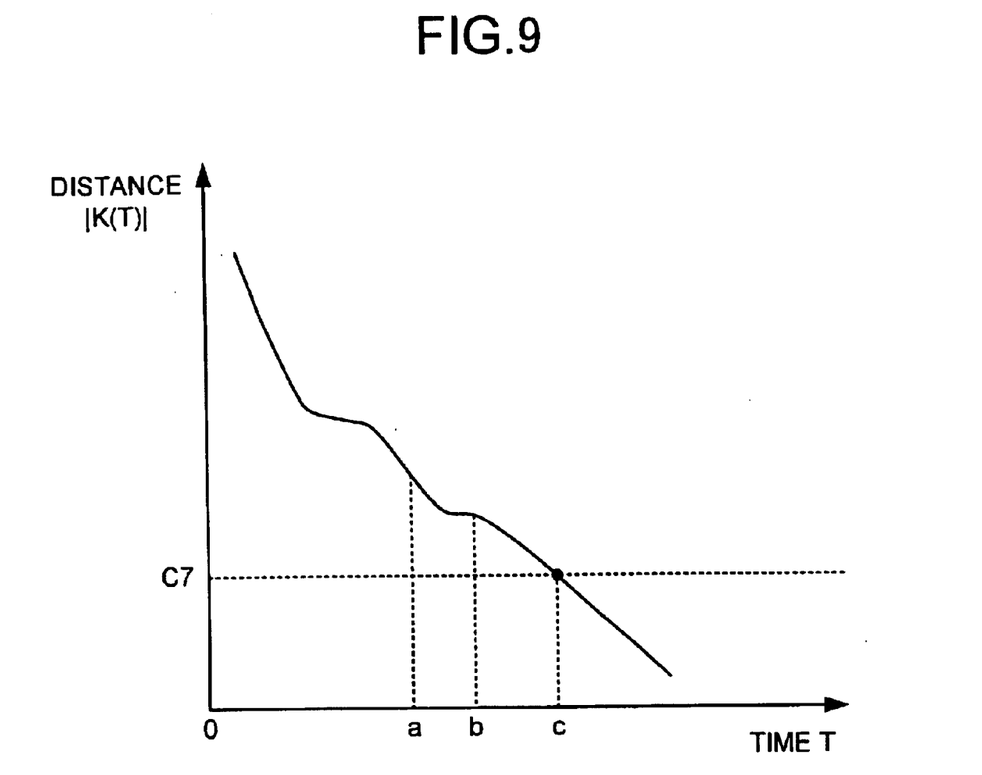
FIG. 9 is a schematic to explain the collision prediction according to the present embodiment.

FIG. 9 schematically illustrates a collision prediction according to the embodiment of the present invention. In FIG. 9, the abscissa represents time t, and the ordinate represents the distance $|k(t)|$ from the own vehicle 1 to the obstacle 70. A broken line in the drawing expresses C7 shown in the equation (7). When the value of $|k(t)|$ is estimated to be smaller than the value of C7, the warning notification section 60 warns the driver of the own vehicle 1. For example, when it is estimated that the own vehicle 1 comes closer to the obstacle 70 than the distance C7 within 3 seconds, a setting is made to give a warning. In other words, C8=3 seconds. In this case, when a time from time a to time c is 5 seconds, a warning is not given. On the other hand, when a time from time b to time c is 3 seconds, a warning is given at this time. As explained above, when the collision prediction section 50 determines that there is a possibility of a collision, the notification control section 61 of the warning notification section 60 instructs the voice notification section 62 and the image notification section 63 to give a warning based on the information. The voice notification section 62 and the image notification section 63 give a warning to the driver of the own vehicle 1 (step S430). The ranges of the values of C1 to C8 may be set to be changed corresponding to the velocity v of the own vehicle 1.

Thereafter, when the driver carries out a control operation to avoid a collision such as application of braking, the driver control monitoring section 65 instructs the collision prediction section 50 to reset the collision prediction signal (step S440). After the collision avoidance control operation is carried out, the driver control monitoring section 65 may instruct the notification control section 61 to stop giving a warning. Alternatively, the warning may be stopped after it is confirmed that there is no possibility of a collision due to an updating of the collision prediction information.

As described above, according to the present embodiment, the collision prediction device includes the sensor matching section 40 that determines the object n and the object m are identical when the change rate of the size of the object n (i.e., the obstacle 70) calculated by the image sensor section 20 is in disagreement with (for example, approximately inversely proportional to) the change rate of the distance from the own vehicle 1 to the object m (i.e., the obstacle 70) calculated by the millimeter-wave sensor 30, and when both obstacles are determined as identical, calculates the relative position h(t) to the own vehicle 1 after a predetermined time. Therefore, the obstacle recognition performance can be improved, and the obstacle can be detected accurately.

While the image sensor section 20 calculates the position of the obstacle 70 on the image according to the above embodiment, the position of the obstacle 70 can also be detected by utilizing the Global Positioning System (GPS) reception function. While the millimeter-wave sensor section 30 is explained to have a cyclopean eye in the above embodiment, a plurality of millimeter wave radars may calculate the distance from the own vehicle 1 to the obstacle 70 and the velocity of the obstacle 70 relative to the own vehicle 1. It is explained that C1 to C8 are fixed to a predetermined value in the above embodiment. However, the image sensor section 20 and the millimeter-wave sensor section 30 may generate a measurement error due to a change in the environment such as weather. Therefore, the predetermined range of C1 to C8 may be set freely.

A computer program according to the present invention realizes the method according to the above aspect on a computer.

As explained above, the present invention provides a collision prediction device capable of accurately detecting an obstacle and predicting collision of a vehicle with the obstacle.

Moreover, it is possible to predict the collision by reflecting the current running state can be obtained.

The present invention provides a collision prediction device capable of efficiently extracting only an object that has a possibility of a collision can be obtained.

Moreover, it is possible to predict the collision by taking into account the avoidance of a collision between the own vehicle and the obstacle.

Moreover, it is possible to inform the driver a forthcoming collision.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A collision prediction device mounted on a own vehicle, comprising:
    an image sensor unit that extracts an object on an image and detects a size and a position of an object on the image;
    a millimeter-wave sensor unit that transmits a millimeter wave and detects a distance between the own vehicle and an object present in a sensing range;
    a sensor matching unit that
        determines that the object detected by the image sensor unit is the same as the object detected by the millimeter-wave sensor when a change rate of a size of the object detected by the image sensor unit on the image is in disagreement with a change rate of a distance from the own vehicle to the object detected by the millimeter-wave sensor, and
        when the objects are determined as identical, defines the object as a prospective collision obstacle, and calculates a relative position of the collision obstacle and the own vehicle after a predetermined time, based on the position detected by the image sensor unit and the distance detected by the millimeter-wave sensor unit; and
    a collision prediction unit that predicts whether there is going to be a collision between the own vehicle and the collision obstacle from the position calculated by the sensor matching unit.

2. The collision prediction device according to claim 1, wherein the sensor matching unit calculates the position of the collision obstacle when the state of the collision obstacle and the own vehicle at the time of predicting the collision possibility is maintained during the predetermined time, as an estimate position of the collision predicted obstacle.

3. The collision prediction device according to claim 1, further comprising:
    a vehicle measurement unit that measures a yaw rate and a velocity of the own vehicle, and calculates a position of the own vehicle after the predetermined time, wherein
    the image sensor unit extracts an obstacle based on one or more of the velocity and the position of the own vehicle calculated by the vehicle measurement unit, and
    the millimeter-wave sensor unit calculates a relative velocity of the obstacle and the own vehicle, and extracts the obstacle based on the velocity of the own vehicle calculated by the vehicle measurement unit and the relative velocity of the obstacle and the own vehicle.

4. The collision prediction device according to claim 1, wherein the collision prediction unit predicts that the collision is going to take place when the relative position is within a predetermined distance from the own vehicle within the predetermined time.

5. The collision prediction device according to claim 1, further comprising:
    a parameter setting unit with which a driver of the own vehicle can freely change the setting of both or any one of the predetermined time and the predetermined distance.

6. The collision prediction device according to claim 1, further comprising:
    a warning notification unit that generates a warning when the collision prediction unit predicts that there is going to be the collision so that a driver of the own vehicle know about collision.

7. The collision prediction device according to claim 3, wherein the collision prediction unit predicts the collision based on the velocity of the own vehicle calculated by the vehicle measurement unit.

8. A method of predicting collision between a vehicle and an obstacle, comprising:
    detecting an object on an image and detecting a size and a position of an object on the image;
    detecting an object using a millimeter wave and detecting a distance between the vehicle and the object using the millimeter wave;
    deciding whether the object detected on the image and the object detected using the millimeter wave are one and the same object when a change rate of a size of the object detected by the image sensor unit on the image is in disagreement with a change rate of a distance from the own vehicle to the object detected by the millimeter-wave sensor;
    defining, when it is decided at the deciding that objects are one and the same object, the object as a prospective collision obstacle;
    calculating a relative position of the collision obstacle and the vehicle after a predetermined time, based on the position detected on the image and the distance detected using the millimeter wave; and
    predicting whether there is going to be a collision between the vehicle and the collision obstacle from the relative position calculated.

9. A computer readable medium storing a program to control a computer to perform a method of predicting collision between a vehicle and an obstacle, the method comprising:
    detecting an object on an image and detecting a size and a position of an object on the image;
    detecting an object using a millimeter wave and detecting a distance between the vehicle and the object using the millimeter wave;
    deciding whether the object detected on the image and the object detected using the millimeter wave are one and the same object when a change rate of a size of the object detected by the image sensor unit on the image is in disagreement with a change rate of a distance from the own vehicle to the object detected by the millimeter-wave sensor;
    defining, when it is decided at the deciding that objects are one and the same object, the object as a prospective collision obstacle;
    calculating a relative position of the collision obstacle and the vehicle after a predetermined time, based on the position detected on the image and the distance detected using the millimeter wave; and
    predicting whether there is going to be a collision between the vehicle and the collision obstacle from the relative position calculated.

* * * * *